3,574,831
THERAPEUTIC HEPARIN-SODIUM
TAUROCHOLATE COMPOSITIONS
Robert Henry Engel and Stephen Joseph Riggi, Suffern,
N.Y., assignors to American Cyanamid Company,
Stamford, Conn.
No Drawing. Filed May 29, 1968, Ser. No. 732,854
Int. Cl. A61r 27/00
U.S. Cl. 424—183
3 Claims

ABSTRACT OF THE DISCLOSURE

A composition capable of absorption through walls of the alimentary canal and producing heparin-like effects comprising heparin and at least about .25 part, by weight of sodium taurocholate per part of heparin.

---

This invention relates to novel heparin compositions which can be effectively administered orally or rectally. More particularly, this invention relates to novel compositions comprising heparin and sodium taurocholate. It relates further to a method of obtaining effective heparin blood levels by the administration of the heparin compositions of this invention via a route involving the absorption through the walls of the alimentary canal.

Heparin is a polysaccharide which occurs naturally in mammals and functions to maintain the fluidity of blood. Heparin concentrates for medical use are usually obtained from the liver or lung tissue of stock animals, and are marketed in final therapeutic form as solutions of a heparin sodium salt. Heparin treatment is indicated where it is desirable to retard the coagulation of blood and reduce hyperlipemia. It is presently administered parenterally and never orally since it has proved ineffective by this route. It is theorized that the activity is due to either degradation by gastric and intestinal fluids or poor absorption through the alimentary canal walls.

Parenteral administration of medicinal compounds is generally regarded as being undersirable since it is cumbersome and painful and requires trained personnel and sterile conditions at the site of treatment. It is preferred to administer medicinal compounds orally since it can be easily and quickly accomplished without the need for special personnel or apparatus. Thus there is a present need to provide a means which permits the administration of heparin compounds with satisfactory therapeutic effects without the need for parenteral administration.

It is an object of the present invention to provide heparin compositions which provide satisfactory therapeutic activity in mammals when introduced via the alimentary canal. It is a further object of the present invention to provide heparin compositions which produce satisfactory therapeutic effects when orally administered to mammals. Further objects of the present invention will become evident in view of the following detailed discussion.

The present invention resides in the discovery that mixtures comprising heparin and sodium taurocholate are capable of being absorbed by the alimentary canal of mammals and affording pharmacologically effective heparin blood levels. These compositions are effective when mixed with water in amounts normally present in the alimentary canal without the need for additional solutes, vehicles or dispersants.

The heparin and sodium taurocholate are employed with effectiveness in compositions containing at least about .25 part by weight of sodium taurocholate per part of heparin. The sodium taurocholate can constitute a large proportion of the composition, e.g. up to ninety or more weight percent and the composition will exhibit heparin-like activity. Furthermore, it has been found that heparin compositions containing sodium taurocholate must be administered in dosage amounts of at least 100 mg./kg. in order to absorb heparin into the blood stream in effective amounts. It is evident that sodium taurocholate-rich compositions will require large dosages to achieve given heparin levels than will compositions richer in heparin. Therefore, in terms of absorbability and practical dose size, compositions comprising the sodium taurocholate in an amount of between about .25 and about 10 part by weight per part of heparin are preferred. In use, the compositions of the present invention may be mixed with sufficient water to form a solution thereof. The use of water is not a critical part of this invention.

The compositions of this invention can be administered orally, intraduodenally or rectally to warm blooded animals. Thus, the compositions of this invention can be formed into tablets, capsules, granules or suppositories when combined with physiologically acceptable carriers, binders, or diluents. The compositions can also be administered in the form of aqueous solutions, suspensions, as well as elixers and similar pharmaceutical vehicles or carriers. For oral administration, the compositions of this invention are coated with an enteric coating such as cellulose acetate, phthalate, styrene-maleic anhydride copolymers, and the like to prevent or minimize degradation of the heparin by gastric juices.

The novel compositions of the present invention may optionally include such materials as preservatives, excipients, buffers, fillers, sweeteners, extenders and the like. Furthermore, these compositions may be modified to include medicinal compounds such as vitamins, antibiotics and compounds which are normally characterized by poor absorption through the alimentary canal wall including vitamin $B_{12}$ and iron salts such as ferrous sulfate, ferrous fumarate and ferrous gluconate.

The effectiveness of the compositions of the present invention depends upon various factors including age, sex, weight, physical condition of the treated animal. Usually in practice the composition is given preliminarily in small dosages and then in increasingly larger doses until satisfactory effectiveness is obtained without significant side effects. Normally the dosage employed will be in the range of above 100 milligrams of heparin per kilogram of body weight preferably from 100 to about 300 milligrams of heparin per kilogram and at a frequency of one to three times per day. These variables can be adjusted to the needs of the patient by the use of gradually increasing dosages. In this instance the determination of the dosage is usually based in part on the propensity of the patient's blood to coagulate and the magnitude of the clearing factor response elicited.

The effect of heparin in mammals in the following examples is determined by performing a clearing factor assay on blood samples as hereinafter described. Blood samples are withdrawn by heart puncture from both the treated and control groups, 30 minutes after administration.

The optical density assay of post-heparin clearing factor is carried out in the following manner: The blood samples obtained by heart puncture are placed in ice cold 12 ml. centrifuge tubes. The tubes are centrifuged and the supernatant plasma is withdrawn as needed. The assay is carried out in a 1 ml. Coleman spectrophotometer cuvette. Exactly 0.6 ml. of 0.05 M tris(hydroxymethyl) aminomethane buffer solution, pH 8.5, 0.3 ml. of 25% w./v. plasma albumin, pH 8.5 and 0.5 ml. of post heparin plasma are added to the cuvette and mixed thoroughly. The optical density is then recorded in a suitable spectrophotometer at 650 m$\mu$. This value represents the enzyme blank and is the limiting value to which the optical density can fall after addition of the substrate. The mixture is then pre-incubated for 2 minutes at 37° C. and 0.1 ml. of 6% Ediol, a lipid emulsion consisting of 50% coconut oil and 12.5% sucrose, marketed by Riber Laboratories, is added and mixed thoroughly. The $T_0$ optical density, which will be about 0.8, is immediately recorded. The mixture is then incubated at 37° C. and readings are taken every 10 to 15 minutes for one hour. The data are plotted as either optical density or the change of optical density with time. Substrate controls rarely fall by more than 0.03 unit.

The following example illustrates the present invention and is not intended to limit the same.

EXAMPLE 1

The compositions detailed in Table I were each administered to eight normal male rats by intraduodenal intubation in volumes of 5 ml./kg. Blood samples were withdrawn after 30 minutes. The blood was centrifuged and the serum assayed for clearing factor activity by the procedure described above. A decrease in optical density at 650 mµ of the respective samples indicates clearing factor activity and is evidence of heparin absorption. The initial optical density was .75. Table I summarizes the response of various compositions with rats as measured by the above procedure. As shown in Table I, compositions containing a combination of heparin and sodium taurocholate were absorbed by the rat in significant amounts. Compositions not containing sodium taurocholate did not show any clearing factor activity.

TABLE I

| | Sodium taurocholate, mg./kg. | Heparin, mg./kg. | Decrease in optical density at 30 minutes |
|---|---|---|---|
| Composition: | | | |
| 1 | 0 | 100 | .04 |
| 2 | 25 | 100 | .10 |
| 3 | 25 | 190 | .19 |
| 4 | 25 | 220 | .23 |
| 5 | 25 | 250 | .27 |

What is claimed is:
1. A composition capable of absorption through walls of the alimentary canal upon oral administration and producing heparin-like effects consisting essentially of heparin and at least about .25 part, by weight, of sodium taurocholate per part of heparin.
2. The composition of claim 1 in dosage unit form.
3. The composition of claim 1 containing sodium taurocholate in amounts of between about 25 and about 10 parts per weight per part of heparin.

References Cited
UNITED STATES PATENTS 3,088,868  5/1963  Windsor _____ 424—183

OTHER REFERENCES

Chemical Abstracts I, vol. 61, entry 7567f, 1964, citing Gianni, Minerva Med., 55 (11) 329–32 (1964).

Chemical Abstracts II, vol. 64, entry 8719e, 1966, citing Chung et al., Yonsei Med. J. 5, 24–8 (1964).

RICHARD L. HUFF, Primary Examiner